(12) United States Patent
Nitanai

(10) Patent No.: US 10,353,241 B2
(45) Date of Patent: Jul. 16, 2019

(54) DISPLAY DEVICE

(71) Applicant: Funai Electric Co., Ltd., Daito, Osaka (JP)

(72) Inventor: Naoki Nitanai, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 15/430,635

(22) Filed: Feb. 13, 2017

(65) Prior Publication Data

US 2017/0235189 A1  Aug. 17, 2017

(30) Foreign Application Priority Data

Feb. 15, 2016 (JP) ................... 2016-025591

(51) Int. Cl.
*G02F 1/1335* (2006.01)

(52) U.S. Cl.
CPC .. *G02F 1/133605* (2013.01); *G02F 1/133608* (2013.01); *G02F 1/133603* (2013.01)

(58) Field of Classification Search
CPC ......... G02F 1/133308; G02F 1/133605; G02F 1/133608; G02F 2001/133314; G02F 2201/465
USPC ...................................................... 362/97.1
See application file for complete search history.

(56) References Cited

U.S. PATENT DOCUMENTS

| 8,007,161 B2* | 8/2011 | Chen ................. G02F 1/133608 349/58 |
| 8,807,805 B2* | 8/2014 | Kuromizu ......... G02F 1/133608 362/249.01 |
| 8,915,606 B2* | 12/2014 | Shima ................. F21V 33/0052 349/58 |
| 2005/0162869 A1* | 7/2005 | Kanatsu ............ G02F 1/133604 362/632 |

(Continued)

FOREIGN PATENT DOCUMENTS

JP    2013-161793 A    8/2013

OTHER PUBLICATIONS

Extended European Search Report of the corresponding European Application No. 17156071.7, dated Apr. 6, 2017.

(Continued)

*Primary Examiner* — Tsion Tumebo
(74) *Attorney, Agent, or Firm* — Global IP Counselors, LLP

(57) ABSTRACT

A display device includes a display, a light source, a housing, an optical component, and a support component. The light source emits light towards the display. The housing accommodates the light source, and includes a bottom portion that has a first holding portion and a side wall that extends towards the display from an outer peripheral edge of the bottom portion. The optical component is disposed between the display and the housing. The support component supports the optical component, and is held by the first holding portion. The support component includes a translucent main body portion that is disposed on the bottom (Continued)

portion and extends towards the optical component, a protruding portion that protrudes in a direction parallel to a main face of the display from the main body portion, and a second holding portion that is provided to the protruding portion and is held by the first holding portion.

18 Claims, 9 Drawing Sheets

(56) References Cited

U.S. PATENT DOCUMENTS

| | | | | |
|---|---|---|---|---|
| 2005/0281050 | A1* | 12/2005 | Chou | F21K 9/00 362/612 |
| 2006/0244891 | A1 | 11/2006 | Tsubokura et al. | |
| 2007/0103908 | A1* | 5/2007 | Tabito | G02F 1/133608 362/294 |
| 2007/0109767 | A1 | 5/2007 | Han et al. | |
| 2009/0135583 | A1* | 5/2009 | Hillman | G02F 1/133603 362/97.1 |
| 2009/0284444 | A1* | 11/2009 | Wilson | G06F 1/1603 345/32 |
| 2010/0008066 | A1* | 1/2010 | Moro | G02F 1/133608 362/97.1 |
| 2012/0063133 | A1* | 3/2012 | Takeuchi | G02F 1/133603 362/235 |
| 2012/0086884 | A1 | 4/2012 | Yoshikawa | |
| 2012/0120325 | A1* | 5/2012 | Shimizu | G02F 1/133608 348/790 |
| 2012/0176557 | A1 | 7/2012 | Shimizu | |
| 2013/0314899 | A1 | 11/2013 | Ye et al. | |

OTHER PUBLICATIONS

The European search report for the corresponding European application No. 19150265.7, dated Mar. 8, 2019.
Communication pursuant to Article 94(3) EPC for the corresponding European application No. 17 156 071.7, dated Mar. 1, 2019.

* cited by examiner

FOURTH MODIFICATION EXAMPLE

FIFTH MODIFICATION EXAMPLE

DISPLAY DEVICE

CROSS-REFERENCE TO RELATED APPLICATIONS

This application claims priority to Japanese Patent Application No. 2016-025591 filed on Feb. 15, 2016. The entire disclosure of Japanese Patent Application No. 2016-025591 is hereby incorporated herein by reference.

BACKGROUND

Field of the Invention

The present invention generally relates to a display device. More specifically, the present invention relates to a display device having a support component that supports an optical sheet from a side of a face that is opposite a display face.

Background Information

Display devices equipped with a post member that supports a rear side of an optical sheet that is opposite to a side to which a display face faces are conventionally known (see Japanese Laid-Open Patent Application Publication No. 2013-161793 (Patent Literature 1), for example).

The above-mentioned Patent Literature 1 discloses a display device comprising a display component, a rear face housing, a light source, and a post member that supports an optical sheet. The rear face housing has a fixing hole. The post member has a fixing protrusion for fixing the post member in the fixing hole in the rear face housing, and a main body portion that supports the optical sheet from the rear side. Also, the post member is disposed away from the light source. Also, the main body portion, the fixing protrusion, and the fixing hole are disposed coaxially as seen in a direction perpendicular to the display face.

Because the distal end of the post member contacts with the optical sheet, shadows tend to appear near the distal end of the post member on the display component. In view of this, in the above-mentioned Patent Literature 1, the post member is formed from a translucent material. Thus, when light from the light source shines on the post member, fewer shadows will be produced on the display component.

SUMMARY

With the display device in the above-mentioned Patent Literature 1, the main body portion, the fixing protrusion, and the fixing hole are disposed coaxially. Therefore, light inside the main body portion readily infiltrates the fixing protrusion, and thus light from the light source component tends to go through the fixing hole and leak to a rear side of the rear face housing. As a result, there is a reduction in the amount of light near the distal end of the support component, which causes shadows at the display.

This invention is conceived in an effort to solve the above problem. One object is to provide a display device with which there are fewer shadows on a display near a distal end of a support component.

[1] In view of the state of the known technology and in accordance with a first aspect of the present invention, a display device comprises a display, a light source, a housing, an optical component, and a support component. The light source emits light towards the display. The housing accommodates the light source, and includes a bottom portion that has a first holding portion and a side wall that extends towards the display from an outer peripheral edge of the bottom portion. The optical component is disposed between the display and the housing. The support component supports the optical component, and is held by the first holding portion. The support component includes a translucent main body portion that is disposed on the bottom portion and extends towards the optical component, a protruding portion that protrudes in a direction parallel to a main face of the display from the main body portion, and a second holding portion that is provided to the protruding portion and is held by the first holding portion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

The configuration of a liquid crystal television device 100 in accordance with a first embodiment will now be described through reference to FIGS. 1 to 7. The liquid crystal television device 100 is an example of the "display device" of the present disclosure.

Basic Configuration of Liquid Crystal Television Device

Figure 1:
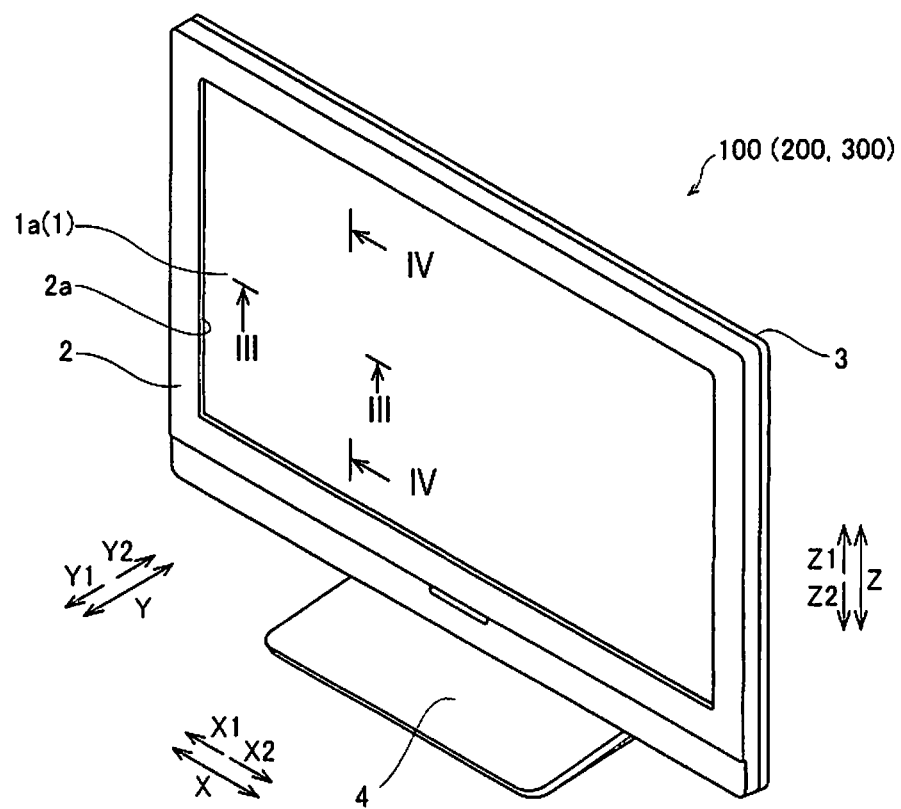
FIG. 1 is a front perspective view of the overall configuration of a liquid crystal television device in accordance with a first embodiment.

As shown in FIG. 1, the liquid crystal television device 100 comprises a display component 1 (e.g., display), a front housing 2, a rear frame 3, and a stand 4 that supports the entire liquid crystal television device 100. The rear frame 3 is an example of the "housing" of the present disclosure.

In the following description, the left and right direction of the liquid crystal television device 100 when the liquid crystal television device 100 is viewed from a position opposite the display component 1 (as seen in a direction perpendicular to a display face 1a (e.g., a main face)) is called the X direction (X1 direction is the leftward direction, and X2 direction is the rightward direction). The forward and rearward direction of the liquid crystal television device 100 is called the Y direction (Y1 direction is the forward direction, and Y2 direction is the rearward direction). The up and down direction is called the Z direction (Z1 direction is upward direction, and Z2 direction is the downward direction).

The front housing 2 is molded from plastic. The front housing 2 is configured so as to support the display component 1. Also, the front housing 2 has an opening 2a for exposing the display component 1 on the front side (the Y1 direction side).

Figure 2:
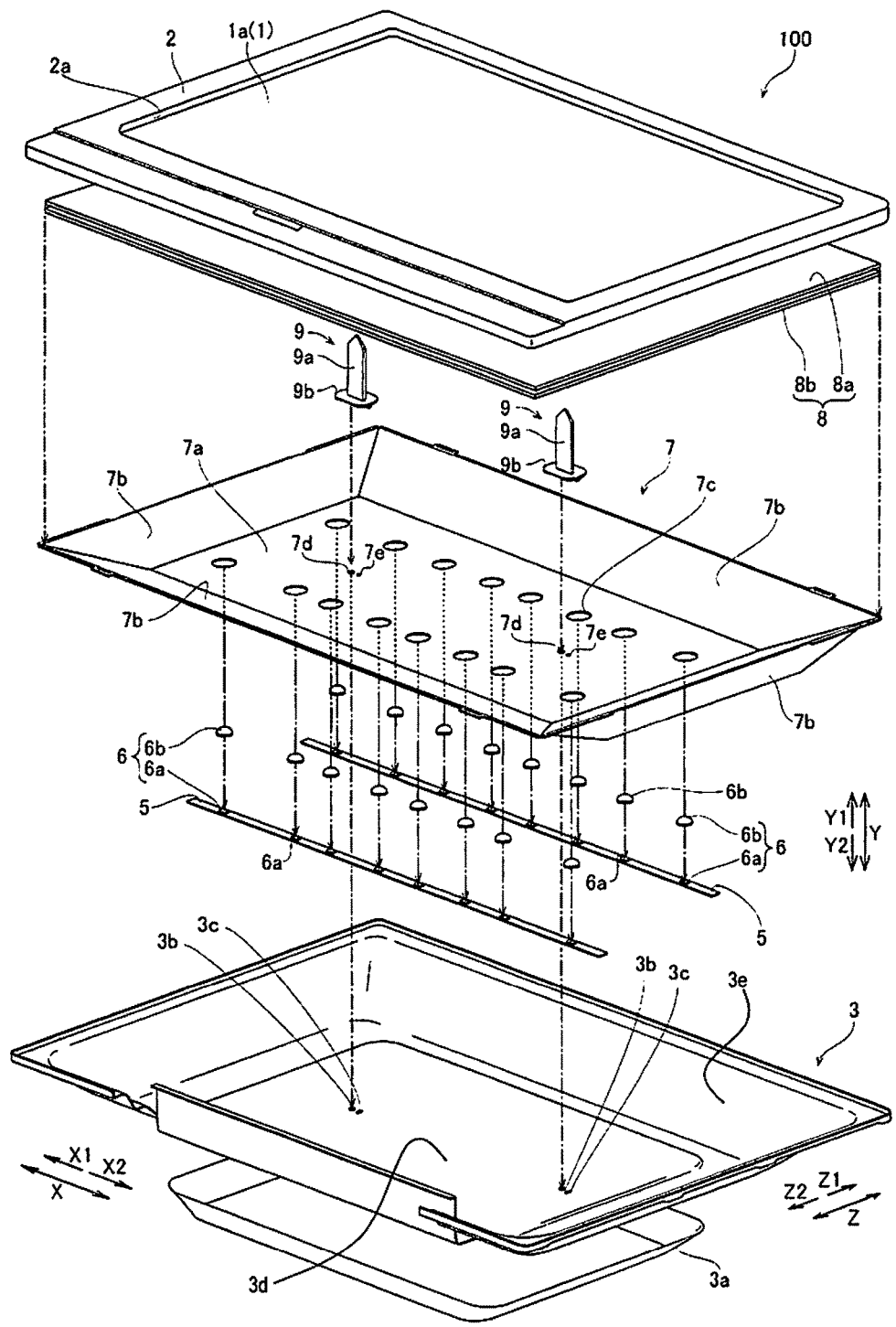
FIG. 2 is an exploded perspective view of the liquid crystal television device shown in FIG. 1.

The rear frame 3 is formed from metal. The rear frame 3 is disposed on the rear face side (the Y2 direction side) of the display component 1. Also, as shown in FIG. 2, the rear frame 3 is formed in a concave shape that is recessed to the rear (the Y2 direction). Also, the rear frame 3 is configured so as to be attached to the front housing 2.

The rear frame 3 includes first holes 3b and second holes 3c. Specifically, the rear frame 3 includes a bottom portion 3d that has the first and second holes 3b and 3c (e.g., first holding portions) and a side wall 3e that extends towards the display component 1 (e.g., display) from an outer peripheral edge of the bottom portion 3d. The first holes 3b and second holes 3c are provided, two each, spaced a specific distance apart in the left and right direction (X direction), in the center of the up and down direction (Z direction). Also, the first holes 3b and second holes 3c are disposed in a single row. The first holes 3b are configured to allow engagement with hook-shaped parts 9c (see FIG. 5) of panel posts 9 (discussed below). The second holes 3c are configured to allow engagement with convex parts 9d (see FIG. 5) of the panel posts 9 (discussed below). This will be discussed in greater detail below. The first holes 3b and second holes 3c are both an example of the "first holding portion" of the present disclosure. Also, the panel posts 9 are an example of the "support component" of the present disclosure. The hook-shaped parts 9c and convex parts 9d are both an example of the "second holding portion" of the present disclosure. The stand 4 is not depicted in FIG. 2. Thus, in the illustrated embodiment, the rear frame 3 (e.g., the housing) includes the first and second holes 3b and 3c (e.g., first holding portions) and is disposed on the rear face side (e.g., the opposite side of the display face) of the display component 1.

Figure 3:
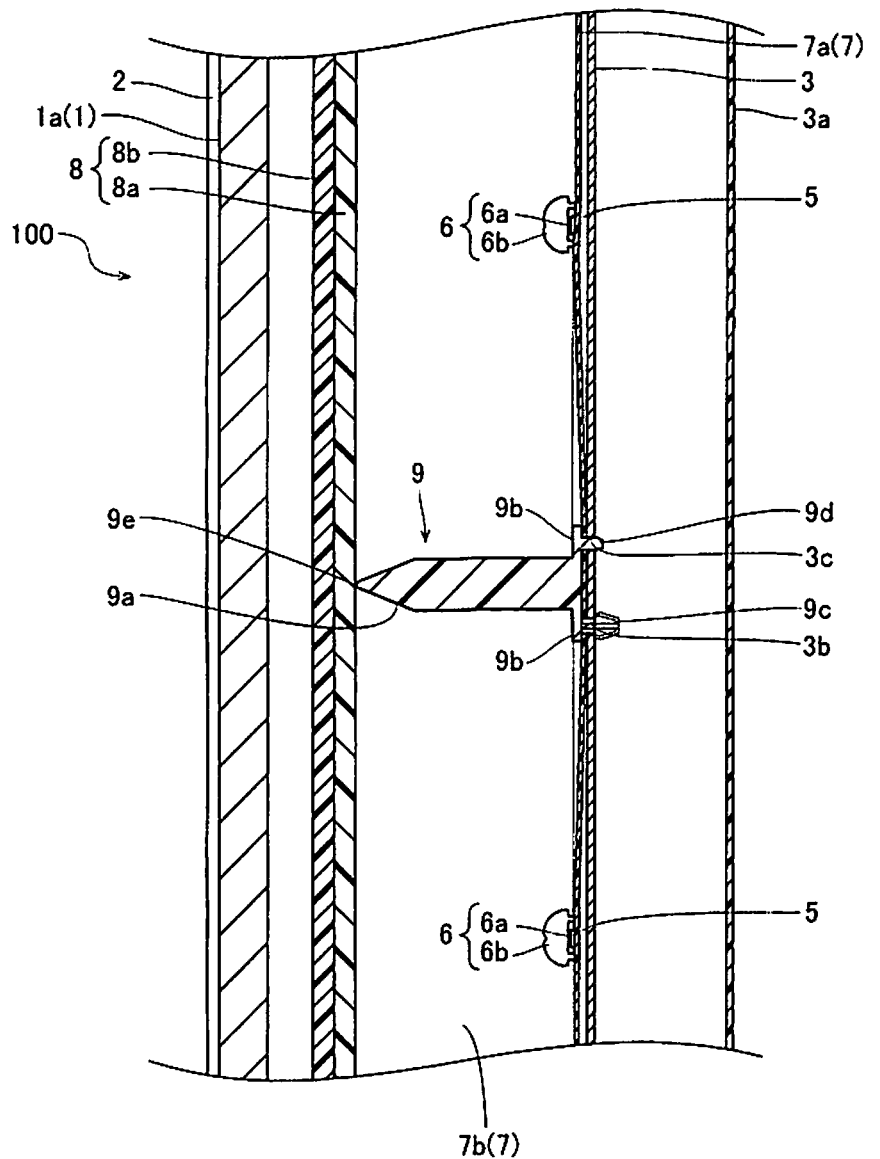
FIG. 3 is a cross sectional view of the liquid crystal television device, taken along III-III line shown in FIG. 1.
Figure 4:
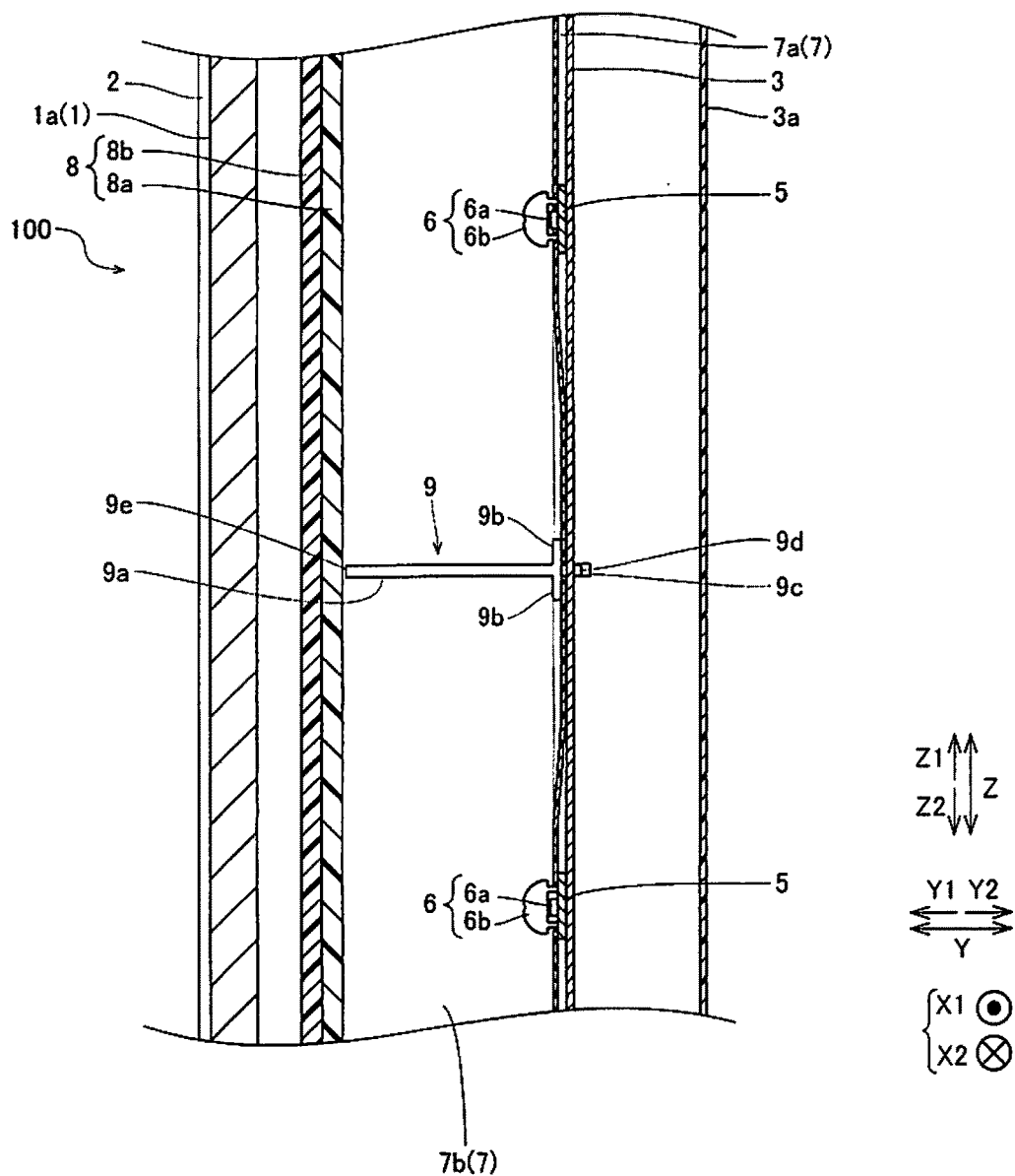
FIG. 4 is a cross sectional view of the liquid crystal television device, taken along IV-IV line shown in FIG. 1.

As shown in FIGS. 3 and 4, the rear frame 3 is provided with a cover 3a. The cover 3a is attached to the rear frame 3 from the rear (the Y2 direction) so as to cover the various boards (not shown), such as a power supply board or a signal processing board, that are installed on the rear frame 3. The cover 3a is also configured so as to cover the first holes 3b and the second holes 3c.

As shown in FIG. 2, the liquid crystal television device 100 comprises LED (light emitting diode) boards 5, light source components 6, a reflecting sheet 7, optical sheets 8, and the panel posts 9, all between (inside) the front housing 2 and the rear frame 3. The panel posts 9 are primarily parts used for suppressing bending of the optical sheets 8 by supporting the optical sheets 8 from the rear face side (the Y2 direction side). This will be described in greater detail below. The reflecting sheet 7 is an example of the "reflector" and "first reflector" of the present disclosure. The optical sheets 8 are an example of the "optical component" of the present disclosure. The light source components 6 are an example of the "light source" of the present disclosure. In the illustrated embodiment, the light source components 6 (e.g., light source) is configured to emit light towards the display component 1 (e.g., display). Also, the light source components 6 are accommodated by the rear frame 3 (e.g., housing). Also, the optical sheets 8 (e.g., optical component) are disposed between the display component 1 (e.g., display) and the rear frame 3 (e.g., housing). Also, the panel posts 9 (e.g., support components) support the optical sheets 8 (e.g., optical component), and are held by the first and second holes 3b and 3c (e.g., first holding portions).

The LED boards 5 are formed in a slender shape extending in the left and right direction (X direction). Two of the LED boards 5 are provided. The two LED boards 5 are disposed in parallel, spaced apart a specific distance in the up and down direction (Z direction), on the surface on the front side (the Y1 direction side) of the rear frame 3. The LED boards 5 are configured to allow the mounting of the light source components 6.

The light source components 6 each include an LEDs 6a and a diffusing lens 6b.

The LEDs 6a are configured to shine light at the display component 1 (see FIG. 1). Eight of the LEDs 6a are mounted in a single row in the left and right direction (X direction), spaced apart, on the mounting face (front face) of each of the two LED boards 5. Also, the LEDs 6a are disposed on the rear face side (the Y2 direction side) of the display component 1. Therefore, the liquid crystal television device 100 is a liquid crystal television device of the so-called directly backlit type.

The diffusing lenses 6b are adhesively fixed to the LED boards 5 so as to cover the display component 1 side (front side) of the LEDs 6a mounted to the LED boards 5. One diffusing lens 6b is provided to each LED 6a. The diffusing lenses 6b are made from acrylic or another such plastic. Also, the diffusing lenses 6b are configured to allow the angle at which the light is emitted from the LEDs 6a toward the display component 1 to be expanded.

The reflecting sheet 7 is molded from PET (polyethylene terephthalate) or another such plastic, and is formed so as to allow light to be reflected. The reflecting sheet 7 is disposed along the face of the rear frame 3 on the display component 1 side, between the rear frame 3 and a diffuser plate 8a (discussed below). Also, the reflecting sheet 7 is disposed between the rear frame 3 and the supports 9a (discussed below) of the panel posts 9. More precisely, the reflecting sheet 7 includes a bottom face 7a and four inclined faces 7b that are disposed surrounding the four sides of the bottom face 7a. The bottom face 7a is formed in a rectangular shape extending in the up and down direction (Z direction) and the left and right direction (X direction). The four inclined faces 7b are formed in a trapezoidal shape that tilts outward toward the front from the ends of the bottom face 7a. The bottom face 7a has light source holes 7c and panel post holes 7d and 7e.

Figure 6:
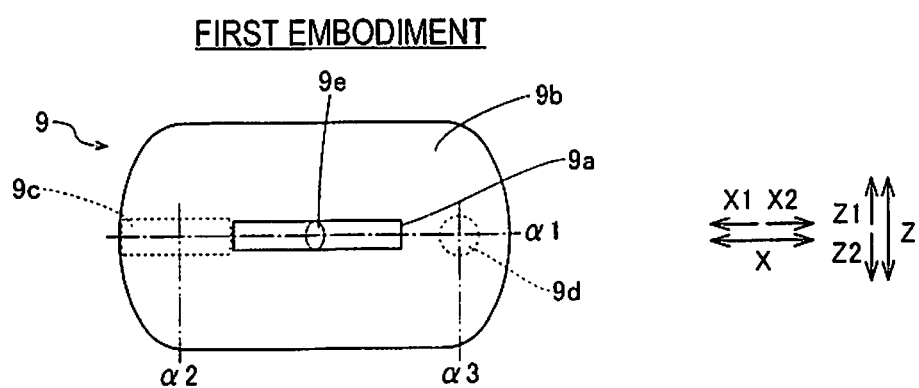
FIG. 6 is a top plan view of the panel post shown in FIG. 5.

The reflecting sheet 7 is disposed so as to overlap the entire region in which the supports 9a (the distal end parts 9e) and the optical sheets 8 come into contact, as seen in a direction perpendicular to the display face 1a (Y direction). The reflecting sheet 7 is configured to reflect light from the light source components 6. Also, the reflecting sheet 7 is disposed so as to overlap the entire region of the main body portions 9a, as seen in a direction perpendicular to the display face 1a (Y direction). Therefore, the reflecting sheet 7 is disposed over the entire region of the main body portions 9a, which are shown in FIG. 6 in a rectangular shape. Furthermore, the reflecting sheet 7 is disposed so that the proportion accounted for by the region overlapping the main body portions 9a with respect to the entire region of the main body portions 9a as seen in a direction perpendicular to the display face 1a (Y direction) is at least 80%. Thus, in the illustrated embodiment, the reflecting sheet 7 (e.g., reflector) is disposed between the rear frame 3 (e.g., housing) and the support 9a (e.g., main body portion), and is configured to reflect the light from the light source component 6 (e.g., light source). Also, in the illustrated embodiment, the reflecting sheet 7 (e.g., reflector) is arranged relative to the support 9a (e.g., main body portion) to overlap at least 80% of an entire region of the support 9a (e.g., main body portion) as seen in the direction perpendicular to the display face 1a. Also, in the illustrated embodiment, the reflecting sheet 7 (e.g., reflector) is arranged relative to the support 9a (e.g., main body portion) to overlap substantially the entire region of the support 9a (e.g., main body portion) as seen in the direction perpendicular to the display face 1a. Also, in the illustrated embodiment, the reflecting sheet 7 (e.g., reflector) is arranged to overlap substantially the entire region in which the support 9a (e.g., main body portion) and the optical sheets 8 (e.g., optical components) contact with each other as seen in the direction perpendicular to the display face 10a. Also, in the illustrated embodiment, the reflecting sheet 7 (e.g., reflector) is arranged to overlap an entire region of the support 9a (e.g., main body portion) in which a distance between the support 9a (e.g., main body portion) and the optical sheets 8 (e.g., optical components) is less than or equal to a predetermined distance as seen in the direction perpendicular to the display face 10a. In particular, in the illustrated embodiment, as shown in FIG. 6, the reflecting sheet 7 overlaps the entire region of the support 9a as viewed in the Y direction. Thus, in this case, the predetermined distance is equal to the entire length L1 (see FIG. 7) of the support 9a in the Y direction. However, the predetermined distance can be equal to the half of the entire length L of the support 9a, or other distance. More specifically, in the illustrated embodiment, the predetermined distance can be equal to or more than the length L2 (see FIG. 7) of the support 9a the cross sectional area at which is 80% of the outer profile of the support 9a as seen in the Y direction.

Sixteen of the light source holes 7c are provided at positions corresponding to the positions on the bottom face 7a where the light source components 6 (the LEDs 6a and the diffusing lenses 6b) are disposed. As shown in FIG. 3, these light source holes 7c in the reflecting sheet 7 are configured such that when the LED boards 5 are attached to the rear frame 3, the light source components 6 (the LEDs 6a and the diffusing lenses 6b) can be disposed (exposed) more to the display component 1 side (the front side) than the reflecting sheet 7.

As shown in FIG. 2, two each of the panel post holes 7d and 7e are provided, spaced apart by a specific amount in the left and right direction (X direction), in the center of the bottom face 7a in the up and down direction (Z direction). The panel post holes 7d and 7e are formed so as to respectively allow the hook-shaped parts 9c and convex parts 9d (discussed below) of the panel posts 9 can be passed through toward the rear (in the Y2 direction). The panel post holes 7d and 7e are provided (coaxially) at positions that overlap respectively with the first holes 3b and second holes 3c of the rear frame 3.

The optical sheets 8 include the diffuser plate 8a and a polarizing filter 8b. The optical sheets 8 are disposed parallel to the bottom face 7a of the reflecting sheet 7.

The diffuser plate 8a is molded from plastic or the like. The diffuser plate 8a is also formed as a flat, rectangular plate. The diffuser plate 8a is disposed between the display component 1 and the light source components 6, and is configured to diffuse the light from the light source components 6. Thus, in the illustrated embodiment, the optical sheets 8 (e.g., the optical components) are disposed between the display component 1 and the light source components 6 (e.g., the light sources) to receive the light from the light source component 6 and to emit the light towards the display component 1.

The polarizing filter 8b is formed as a flat, rectangular plate of about the same size as the diffuser plate 8a. Also, the polarizing filter 8b is disposed parallel to the diffuser plate 8a. The polarizing filter 8b is disposed between the diffuser plate 8a and the display component 1, and is configured to align the polarization direction of the light transmitted by the diffuser plate 8a, and emit this light to the display component 1.

Configuration of Panel Posts

As shown in FIG. 3, the panel posts 9 are disposed away from the light source components 6. The panel posts 9 are molded from a translucent resin material. More specifically, the panel posts 9 each include the support 9a, a protruding portion 9b, the hook-shaped part 9c, and the convex part 9d. The supports 9a are an example of the "main body portion" of the present disclosure.

The supports 9a each have a distal end part 9e with an acute angle to the front (the Y1 direction), and are formed extending in the forward and rearward direction (Y direction). Also, the supports 9a are formed as a pentagonal, flat plate whose thickness direction is the up and down direction (Z direction). The supports 9a are configured to support the optical sheets 8 when the distal end parts 9e are brought into contact with the optical sheets 8 from the rear side (the Y2 direction side) of the optical sheets 8. Also, the supports 9a protrude from the rear frame 3 to the optical sheet 8 side (the display component 1 side). The supports 9a are also translucent.

Figure 5:
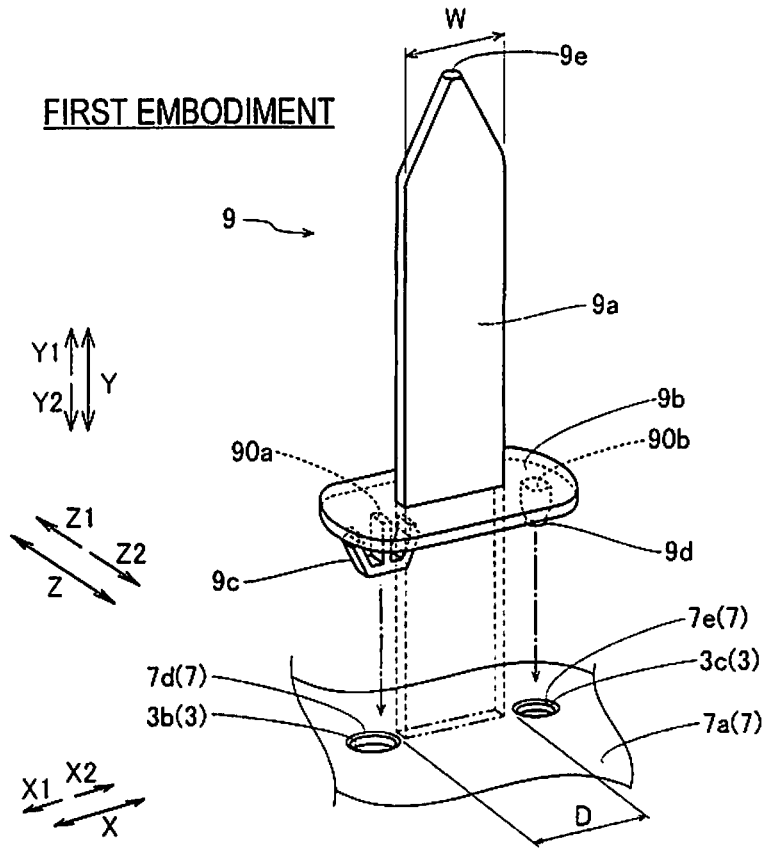
FIG. 5 is a partial exploded perspective view of the liquid crystal television device, illustrating the attachment of a panel post to a rear frame of the liquid crystal television device.

The reflecting sheet 7 is disposed so as to overlap at least the supports 9a, as seen in a direction perpendicular to the display face 1a (Y direction) of the display component 1. More precisely, as shown in FIG. 6, the supports 9a are seen as a rectangular shape, as seen in a direction perpendicular to the display face 1a (Y direction). As shown in FIG. 5, the reflecting sheet 7 is disposed at least in the region corresponding to these rectangular supports 9a. Consequently, the reflecting sheet 7 is configured to allow light from the light source components 6 to be reflected to the display component 1 side.

As shown in FIG. 6, the protruding portions 9b are formed so as to protrude from the lower part (the rear end) of the support 9a outward in a flange shape (in a direction parallel to the display face 1a of the display component 1 from the support 9a). More precisely, the protruding portions 9b are formed as an approximately elliptical, flat plate whose lengthwise direction is the left and right direction (X direction), as seen in a direction perpendicular to the display face 1a (Y direction). The protruding portions 9b extend in the up and down direction (Z direction) and in the left and right direction (X direction). Specifically, the protruding portions 9b are parallel to the bottom face 7a of the rear frame 3 and to the optical sheets 8. Also, the supports 9a are disposed in the approximate center of the protruding portions 9b, as seen in a direction perpendicular to the display face 1a (Y direction). The protruding portions 9b are configured to sandwich the reflecting sheet 7 along with the rear frame 3, which helps keep the reflecting sheet 7 from sagging.

As shown in FIGS. 5 and 6, the hook-shaped parts 9c and the convex parts 9d are provided on both sides of the supports 9a so as to sandwich the supports 9a. More precisely, the hook-shaped parts 9c are provided on the left side (the X1 direction side) of the supports 9a. The convex parts 9d are provided on the right side (the X2 direction side) of the supports 9a. The hook-shaped parts 9c and the convex parts 9d are disposed offset from the supports 9a, so as not to overlap each other, as seen in a direction perpendicular to the display face 1a (Y direction). Also, as shown in FIG. 5, the first holes 3b and the second holes 3c of the rear frame 3 in which the hook-shaped parts 9c and the convex parts 9d respectively engage are disposed offset from the supports 9a, so as substantially not to overlap each other, as seen in a direction perpendicular to the display face 1a (Y direction).

The hook-shaped parts 9c are provided on the rear side (the Y2 direction side) of the protruding portions 9b. The hook-shaped parts 9c are formed so that their lengthwise direction is the left and right direction (X direction), as seen from the rear (the Y2 direction). As shown in FIG. 6, the hook-shaped parts 9c are disposed at a position where the center in the short-side direction (Z direction) overlaps a center line α1 that bisects the supports 9a in the short-side direction (Z direction), as seen in a direction perpendicular to the display face 1a (Y direction). Also, the hook-shaped parts 9c are disposed at positions where a center line α2 that bisects the hook-shaped parts 9c in the lengthwise direction (X direction) does not overlap the supports 9a, as seen in a direction perpendicular to the display face 1a (Y direction). As shown in FIG. 3, the hook-shaped parts 9c are configured to engage in the first holes 3b of the rear frame 3, thereby restricting the movement of the supports 9a in the forward and rearward direction (Y direction) with respect to the rear frame 3.

The connected portions 90a of the hook-shaped parts 9c and the protruding portions 9b (see FIG. 5) are disposed so as not to overlap the supports 9a, as seen in a direction perpendicular to the display face 1a (Y direction). Also, the connected portions 90b of the convex parts 9d and the protruding portions 9b (see FIG. 5) are disposed so as not to overlap the supports 9a, as seen in a direction perpendicular to the display face 1a (Y direction).

The convex parts 9d are provided to the rear (Y2 direction side) face of the protruding portions 9b. As shown in FIG. 6, the convex parts 9d are disposed at a position where the center line in the up and down direction (Z direction) overlaps the center line α1 that bisects the supports 9a in the short-side direction (Z direction), as seen in a direction perpendicular to the display face 1a (Y direction). Also, the convex parts 9d are disposed at a position where the center line α3 of the convex parts 9d in the X direction does not overlap the supports 9a, as seen in a direction perpendicular to the display face 1a (Y direction). As shown in FIG. 3, in a state in which the hook-shaped parts 9c are engaged with the first holes 3b of the rear frame 3, the convex parts 9d engage with the second holes 3c of the rear frame 3, which determines the position of the supports 9a in the rotational direction with respect to the rear frame 3. The distance between the centers of the first holes 3b and the second holes 3c is substantially equal to the distance between the center line α2 and the center line α3 (see FIG. 6). As shown in FIG. 5, the distance D between the first holes 3b and the second holes 3c is greater than the width W of the supports 9a in the left and right direction (X direction). Thus, in the illustrated embodiment, the panel posts 9 (e.g., support components) each include the translucent support 9a (e.g., main body portion), the protruding portion 9b, the hook-shaped part 9c and the convex part 9d (e.g., second holding portions). The support 9a is disposed on the bottom portion 3d of the rear frame 3, and extends towards the optical sheets 8 (e.g., optical components). Specifically, the support 9a protrudes from the rear frame 3 (e.g., housing) towards the optical sheets 8 (e.g., optical components). The protruding portion 9b protrudes in the direction parallel to the display face 1a (e.g., main face) of the display component 1 from the support 9a (e.g., main body portion). The hook-shaped part 9c and the convex part 9d (e.g., second holding portions) are provided to the protruding portion 9b and are held by the first hole 3b and the second hole 3c (e.g., first holding portions). Specifically, the hook-shaped part 9c and the convex part 9d (e.g., second holding portions) engage with the first hole 3b and the second hole 3c (e.g., first holding portions). Also, in the illustrated embodiment, the connected portion 90a of the hook-shaped part 9c (e.g., second holding portion) and the protruding portion 9b is located at a substantially non-overlapping location relative to the support 9a (e.g., main body portion) as seen in a direction perpendicular to the display face 1a, as shown in FIGS. 5 and 6. Furthermore, in the illustrated embodiment, the connected portion 90b of the convex part 9d (e.g., second holding portion) and the protruding portion 9b is located at a substantially non-overlapping location relative to the support 9a (e.g., main body portion) as seen in a direction perpendicular to the display face 1a, as shown in FIGS. 5 and 6. Also, in the illustrated embodiment, at least a part of the hook-shaped part 9c or the convex part 9d (e.g., second holding portion) is located at a non-overlapping location relative to the support 9a (e.g., main body portion) as seen in a direction perpendicular to the display face 1a, as shown in FIGS. 5 and 6. Also, in the illustrated embodiment, the hook-shaped part 9c and the convex part 9d (e.g., second holding portions) are located at a non-overlapping location relative to support 9a (e.g., the main body portion) as seen in the direction perpendicular to the display face 1a, as shown in FIG. 6. Also, in the illustrated embodiment, the first hole 3b and the second hole 3c (e.g., first holding portions) are located at a substantially non-overlapping location relative to the support 9a (e.g., main body portion) as seen in the direction perpendicular to the display face 1a, as shown in FIG. 6. Also, in the illustrated embodiment, the hook-shaped part 9c and the convex part 9d (e.g., two of the second holding portions) are provided, and the hook-shaped part 9c and the convex part 9d (e.g., second holding portions) are provided on both sides of the support 9a (e.g., main body portion) as seen in the direction perpendicular to the display face 1a, as shown in FIG. 6. Also, in the illustrated embodiment, the support 9a (e.g., main body portion) has a rectangular shape as seen in the direction perpendicular to the display face 1a, and the hook-shaped part 9c and the convex part 9d (e.g., second holding portions) are adjacent to the support 9a (e.g., main body portion) in the X direction (e.g., lengthwise direction of the main body). Also, in the illustrated embodiment, the hook-shaped part 9c (e.g., second holding portion) has a rectangular shape as seen in the direction perpendicular to the display face 1a, and the center line α2 of the hook-shaped part 9c (e.g., second holding portion) that bisects the hook-shaped part 9c (e.g., second holding portion) in the X direction (e.g., lengthwise direction of the second holding portion) is located at a non-overlapping location relative to the support 9a (e.g., main body portion). Also, in the illustrated embodiment, the first hole 3b (e.g., first holding portion) includes a hole, and the hook-shaped part 9c (e.g., second holding portion) includes a hook that extends through the first hole 3b to engage with the first hole 3b. Also, in the illustrated embodiment, the support 9a (e.g., main body portion) has a rectangular shape as seen in the direction perpendicular to the display face 1a, the first hole 3b and the second hole 3c (e.g., two of the first holding portions) are provided corresponding to the hook-shaped part 9c and the convex part 9d (e.g., second holding portions), and the distance D between the first hole 3b and the second hole 3c (e.g., first holding portions) is larger than the width W of the support 9a (e.g., main body portion) in the X direction (e.g., lengthwise direction of the main body portion) as seen in the direction perpendicular to the display face 1a.

Path of Light Inside Panel Posts

Figure 7:
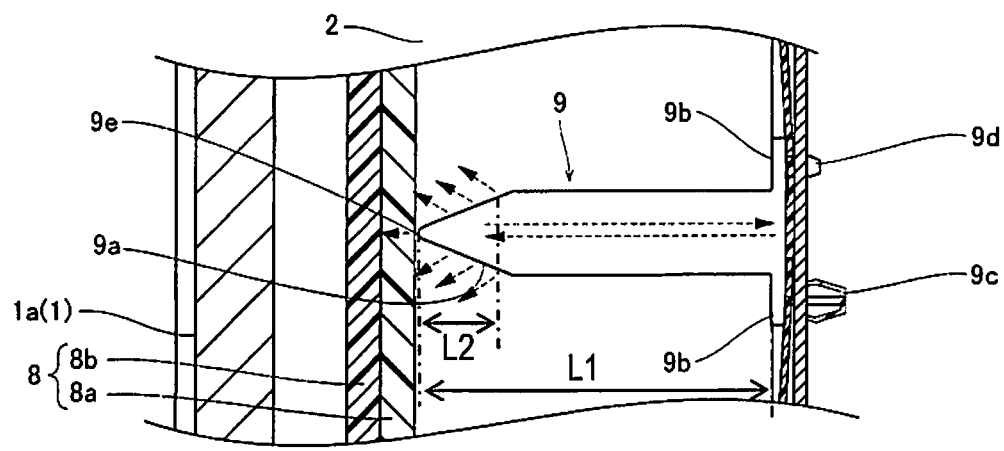
FIG. 7 is a cross sectional view of the liquid crystal television device, illustrating the path of the light passing through the panel post.

The path of light that has infiltrated the inside of the panel posts 9 will now be described through reference to FIG. 7.

The light that has infiltrated the inside of the supports 9a (panel posts 9) is reflected at the surface of the supports 9a while being divided into light facing forward (Y1 direction) and light facing rearward (Y2 direction). The light facing rearward (Y2 direction) is then reflected forward (Y1 direction) by the reflecting sheet 7 disposed along the rear frame 3. The light reflected forward (Y1 direction) is then to the outside of the panel posts 9 from near the distal end parts 9e of the panel posts 9, and goes through the optical sheets 8 to illuminate the display component 1. Because the supports 9a of the panel posts 9 and the hook-shaped parts 9c and convex parts 9d of the supports 9a of the panel posts 9 are disposed offset, so as not to overlap each other, as seen in a direction perpendicular to the display face 1a (Y direction), the light facing rearward (Y2 direction) is reflected forward (Y1 direction) without (substantially without) passing through the first holes 3b and the second holes 3c of the rear frame 3.

Effect of First Embodiment

The following effect can be obtained with the first embodiment.

As discussed above, in the first embodiment, the first holes 3b and second holes 3c are provided to the rear frame 3, the panel posts 9 are provided with the supports 9a and with the hook-shaped parts 9c and convex parts 9d that respectively engage with the first holes 3b and the second holes 3c, and the connected portions 90a and 90b of the hook-shaped parts 9c, the convex parts 9d, and the protruding portions 9b are disposed so as not to overlap the supports 9a, as seen in a direction perpendicular to the display face 1a. Consequently, compared to when the supports 9a and the connected portions 90a and 90b are disposed so as to overlap as seen in a direction perpendicular to the display face 1a, since the hook-shaped parts 9c and the convex parts 9d are disposed away from the ends of the supports 9a on the rear frame 3 side, light is less likely to infiltrate the hook-shaped parts 9c and the convex parts 9d from the supports 9a, light leakage from the rear frame 3 can so forth can be suppressed, and more light will be reflected toward the distal end part 9e side of the panel posts 9 on the rear frame 3 side. As a result, fewer shadows will be produced at the display component 1 near the distal end parts 9e of the panel posts 9, which are attributable to the leakage of light from the light source components 6 at a side of a face (rear face side) of the rear frame 3 that is not the display face 1a.

Also, as discussed above, in the first embodiment, there is further provided a reflecting sheet 7 that is disposed between the rear frame 3 and the supports 9a, and that is disposed so as to overlap the entire region where the supports 9a and the optical sheets 8 are in contact as seen in a direction perpendicular to the display face 1a, and that is configured to be able to reflect light from the light source components 6. Consequently, since the reflecting sheet 7 is disposed overlapping the entire region where the supports 9a and the optical sheets 8 are in contact, light from the optical sheet 8 side can be effectively reflected by the reflecting sheet 7.

Also, as discussed above, in the first embodiment, the reflecting sheet 7 is disposed overlapping the entire region of the supports 9a as seen in a direction perpendicular to the display face 1a. Consequently, since the reflecting sheet 7 is disposed so as to overlap the entire region of the supports 9a as seen in a direction perpendicular to the display face 1a with respect to the supports 9a, light from the optical sheet 8 can be effectively reflected by the reflecting sheet 7.

As discussed above, in the first embodiment, the hook-shaped parts 9c and the convex parts 9d are provided on both sides of the supports 9a so as to flank the supports 9a. Consequently, on both sides of the supports 9a, the hook-shaped parts 9c and the convex parts 9d are respectively engaged with the first holes 3b and the second holes 3c (the panel posts 9 are attached to the rear frame 3), so even if the hook-shaped parts 9c, the convex parts 9d, the first holes 3b, and the second holes 3c are offset with respect to the supports 9a, the panel posts 9 can still be attached in a stable state to the rear frame 3.

Second Embodiment

A second embodiment will now be described through reference to FIGS. 1 and 8. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In this second embodiment, unlike in the first embodiment above in which the panel posts 9 are engaged in holes (the first holes 3b and the second holes 3c) in the rear frame 3 disposed parallel to the reflecting sheet 7, an example will be given in which panel posts 209 are engaged in cut-and-lifted parts 203f made in a rear frame 203 and that pass through the reflecting sheet 7. Those components that are the same as in the first embodiment above will be numbered the same as in the first embodiment and will not be described again. The rear frame 203 is an example of the "housing" of the present disclosure. The panel posts 209 are an example of the "support component" of the present disclosure.

Configuration of Rear Frame and Panel Posts

Figure 8:
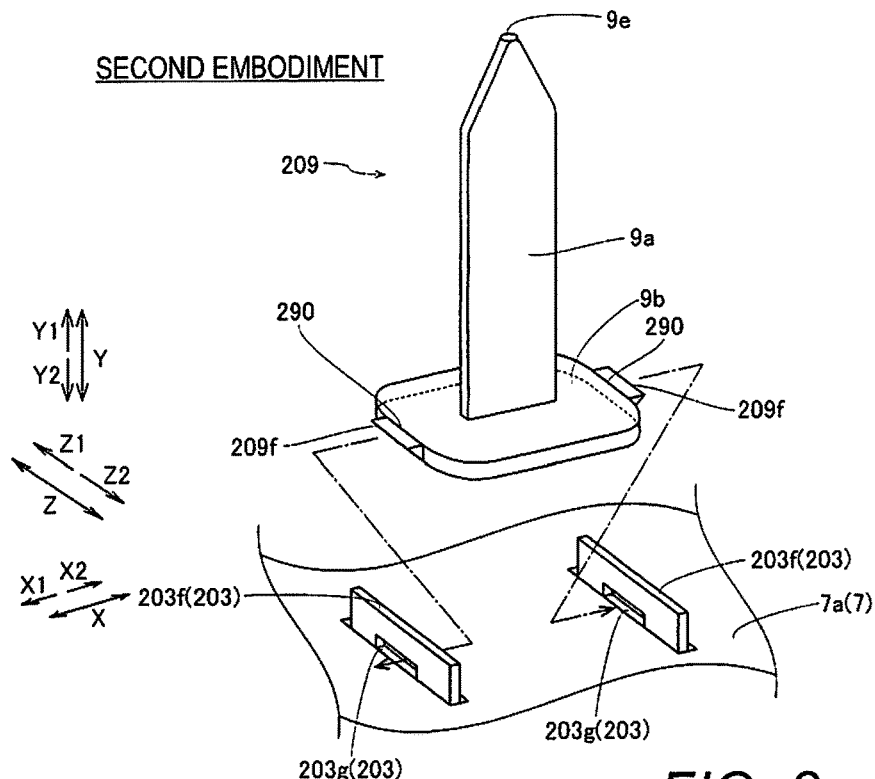
FIG. 8 is a partial exploded perspective view of a liquid crystal television device in accordance with a second embodiment, illustrating the attachment of a panel post to a rear frame of the liquid crystal television device.

As shown in FIG. 8, with the liquid crystal television device 200 in accordance with the second embodiment (see FIG. 1), the pair of cut-and-lifted parts 203f, which pass forward (in the Y1 direction) through the reflecting sheet 7 and protrude to the display component 1 side, are formed on the rear frame 203. Also, a pair of engaging protrusions 209*f*, which protrude parallel to the optical sheets 8 (in the X1 direction and the X2 direction), are formed on the panel posts 209. The liquid crystal television device 200 is an example of the "display device" of the present disclosure. The cut-and-lifted parts 203*f* are an example of the "first holding portion" of the present disclosure. The engaging protrusions 209*f* are an example of the "second holding portion" of the present disclosure.

The cut-and-lifted parts 293*f* are formed by cutting and lifting up parts of the rear frame 203. Also, the cut-and-lifted parts 203*f* have a flat, rectangular shape that extends in the forward and rearward direction (Y direction) and the up and down direction (Z direction). The cut-and-lifted parts 293*f* are spaced a specific distance apart in the left and right direction (X direction). This specific distance is slightly greater than the length of the protruding portions 9*b* of the panel posts 209 in the left and right direction (X direction). Also, the cut-and-lifted parts 293*f* have holes 293*g* that pass through in the thickness direction (X direction).

The two engaging protrusions 209*f* are provided to the X1 direction end and the X2 direction end of each of the protruding portions 9*b*. The engaging protrusions 209*f* are formed in a triangular prism shape that extends in the up and down direction. Also, the configuration is such that the engaging protrusions 209*f* are engaged in the holes 293*g* (the cut-and-lifted parts 203*f*), which allows the panel posts 209 to be attached to the rear frame 203. The connected portions 290 between the engaging protrusions 209*f* and the protruding portions 9*b* are disposed so as not to overlap the supports 9*a* as seen in a direction perpendicular to the display face 1*a* (Y direction).

The rest of the configuration in the second embodiment is the same as in the first embodiment above. Thus, in the illustrated embodiment, the cut-and-lifted parts 203*f* (e.g., first holding portions) extend through the reflecting sheets 7 (e.g., reflector) and protrude towards the display component 1, and the engaging protrusions 209*f* (e.g., second holding portions) protrude in the direction parallel to the display face 1*a* of the display component 1. In the illustrated embodiment, the panel posts 209 (e.g., support components) each include the translucent support 9*a* (e.g., main body portion), the protruding portion 9*b*, and the engaging protrusions 209*f* (e.g., second holding portions). The support 9*a* is disposed on a bottom portion of the rear frame 203, and extends towards the optical sheets 8 (e.g., optical components). Specifically, the support 9*a* protrudes from the rear frame 3 (e.g., housing) towards the optical sheets 8 (e.g., optical components). The protruding portion 9*b* protrudes in the direction parallel to the display face 1*a* (e.g., main face) of the display component 1 from the support 9*a* (e.g., main body portion). The engaging protrusions 209*f* (e.g., second holding portions) are provided to the protruding portion 9*b* and are held by the cut-and-lifted parts 293*f* (e.g., first holding portions). Specifically, the engaging protrusions 209*f* (e.g., second holding portions) engage with the cut-and-lifted parts 293*f* (e.g., first holding portions). Also, in the illustrated embodiment, the connected portions of the engaging protrusions 209*f* (e.g., second holding portions) and the protruding portion 9*b* are located at a substantially non-overlapping location relative to the support 9*a* (e.g., main body portion) as seen in a direction perpendicular to the display face 1*a*. Furthermore, in the illustrated embodiment, Also, in the illustrated embodiment, the engaging protrusions 209*f* (e.g., second holding portions) are located at a non-overlapping location relative to support 9*a* (e.g., the main body portion) as seen in the direction perpendicular to the display face 1*a*. Also, in the illustrated embodiment, the cut-and-lifted parts 293*f* (e.g., first holding portions) are located at a substantially non-overlapping location relative to the support 9*a* (e.g., main body portion) as seen in the direction perpendicular to the display face 1*a*. Also, in the illustrated embodiment, the engaging protrusions 209*f* (e.g., two of the second holding portions) are provided, and the engaging protrusions 209*f* (e.g., second holding portions) are provided on both sides of the support 9*a* (e.g., main body portion) as seen in the direction perpendicular to the display face 1*a*. Also, in the illustrated embodiment, the support 9*a* (e.g., main body portion) has a rectangular shape as seen in the direction perpendicular to the display face 1*a*, and the engaging protrusions 209*f* (e.g., second holding portions) are adjacent to the support 9*a* (e.g., main body portion) in the X direction (e.g., lengthwise direction of the main body). Also, in the illustrated embodiment, the engaging protrusions 209*f* (e.g., second holding portion) has a rectangular shape as seen in the direction perpendicular to the display face 1*a*, and the center lines of the engaging protrusions 209*f* (e.g., second holding portions) that bisects the engaging protrusions 209*f* (e.g., second holding portions) in the X direction (e.g., lengthwise direction of the second holding portion) are located at non-overlapping locations relative to the support 9*a* (e.g., main body portion). Also, in the illustrated embodiment, the cut-and-lifted parts 293*f* (e.g., first holding portion) include the holes 203*g*, and the engaging protrusions 209*f* (e.g., second holding portions) include hooks that extend through the holes 293*g* to engage with the holes 203*b*. Also, in the illustrated embodiment, the support 9*a* (e.g., main body portion) has a rectangular shape as seen in the direction perpendicular to the display face 1*a*, the cut-and-lifted parts 293*f* (e.g., two of the first holding portions) are provided corresponding to the engaging protrusions 209*f* (e.g., second holding portions), and the distance between the cut-and-lifted parts 203*f* (e.g., first holding portions) is larger than the width W of the support 9*a* (e.g., main body portion) in the X direction (e.g., lengthwise direction of the main body portion) as seen in the direction perpendicular to the display face 1*a*.

Effect of Second Embodiment

The following effect can be obtained with the second embodiment.

With the second embodiment, just as with the first embodiment above, the cut-and-lifted parts 293*f* are provided to the rear frame 203, the panel posts 209 are provided with the supports 9*a* and with the engaging protrusions 209*f* that engage with the cut-and-lifted parts 203*f*, and the connected portions 290 between the engaging protrusions 209*f* and the protruding portions 9*b* are disposed so as not to overlap the supports 9*a* as seen in a direction perpendicular to the display face 1*a*. Consequently, fewer shadows will be produced at the display component 1 near the distal end parts 9*e* of the panel posts 209, which are attributable to the leakage of light from the light source components 6 at a side of a face (rear face side) of the rear frame 203 that is not the display face 1*a*.

Also, in the second embodiment, as discussed above, the cut-and-lifted parts 203*f* are formed so as to pass through the reflecting sheet 7 and protrude to the display component 1 side, and the engaging protrusions 209*f* are formed so as to protrude parallel to the optical sheets 8. Consequently, if the rear frame 203 is made of sheet metal, the cut-and-lifted parts 293*f* can be easily formed by cutting and lifting. Also, compared to when the engaging protrusions 209f are engaged in holes that pass through to a side of a face (rear face side) that is not the display face 1a, there will be less leakage of light from the light source components 6 on the rear face side of the rear frame 203, so even fewer shadows will be produced on the display component 1 near the distal ends 9e of the panel posts 209.

Third Embodiment

A third embodiment will now be described through reference to FIGS. 1 and 9. In view of the similarity between the first to third embodiments, the parts of the third embodiment that are identical to the parts of the first and second embodiments will be given the same reference numerals as the parts of the first and second embodiments. Moreover, the descriptions of the parts of the third embodiment that are identical to the parts of the first and second embodiment may be omitted for the sake of brevity. In this third embodiment, unlike in the first embodiment above in which the reflecting sheet 7 is disposed to the rear (in the Y2 direction) of the supports 9a of the panel posts 9, an example is given in which a panel post-use reflecting sheet 307, rather than the reflecting sheet 7, is disposed to the rear (in the Y2 direction) of the supports 9a of the panel posts 9. Those components that are the same as in the first embodiment above will be numbered the same as in the first embodiment and will not be described again. The panel post-use reflecting sheet 307 is an example of the "second reflector" of the present disclosure.

Configuration of Panel Post-Use Reflecting Sheet

Figure 9:
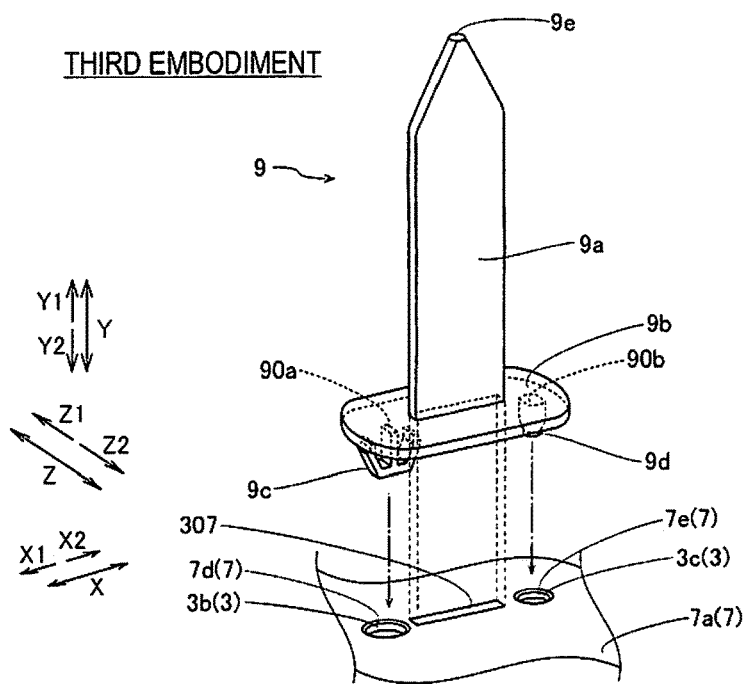
FIG. 9 is a partial exploded perspective view of a liquid crystal television device in accordance with a third embodiment, illustrating the attachment of a panel post to a rear frame of the liquid crystal television device.

As shown in FIG. 9, the liquid crystal television device 300 in accordance with the third embodiment (see FIG. 1) includes a panel post-use reflecting sheet 307 that is disposed so as to overlap the entire region of the supports 9a, as seen in a direction perpendicular to the display face 1a (Y direction). This panel post-use reflecting sheet 307 is disposed between the rear frame 3 and the supports 9a (protruding portions 9b). Also, the panel post-use reflecting sheet 307 has higher reflectivity of light than the reflecting sheet 7. The liquid crystal television device 300 is an example of the "display device" of the present disclosure.

The panel post-use reflecting sheet 307 is disposed so as to overlap substantially the entire region where the supports 9a (distal end parts 9e) and the optical sheets 8 come into contact, as seen in a direction perpendicular to the display face 1a (Y direction). Also, the panel post-use reflecting sheet 307 is configured to reflect light from the light source components 6. The panel post-use reflecting sheet 307 is disposed so as to overlap substantially the entire region of the supports 9a as seen in a direction perpendicular to the display face 1a (Y direction). That is, the panel post-use reflecting sheet 307 is disposed so that the proportion accounted for by the region overlapping the main body portions 9a with respect to the entire region of the main body portions 9a as seen in a direction perpendicular to the display face 1a is at least 80%. In the illustrated embodiment, the panel post-use reflecting sheet 307 can be independent from the reflecting sheet 7 as a separate part. The panel post-use reflecting sheet 307 can be adhered on the reflecting sheet 7 at the suitable location by adhesive, tape or any other suitable manner as needed and/or desired.

The rest of the configuration in the third embodiment is the same as that in the first embodiment above. Thus, in the illustrated embodiment, the reflector includes the reflecting sheet 7 (e.g., first reflector) that is disposed along a front face of the rear frame 3 (e.g., housing) facing towards the display component 1, and the panel post-use reflecting sheet 307 (e.g., second reflector) that is disposed between the rear frame 3 (e.g., housing) and the support 9a (e.g., main body portion) and is arranged to overlap the support 9a (e.g., main body portion) as seen in the direction perpendicular to the display face 1a. The panel post-use reflecting sheet 307 (e.g., second reflector) has a reflectivity of light that is higher than that of the reflecting sheet 7 (e.g., first reflector).

Effect of Third Embodiment

The following effect can be obtained with the third embodiment.

With the third embodiment, just as with the first embodiment above, the first holes 3b and the second holes 3c are provided to the rear frame 3, the panel posts 9 are provided with the supports 9a and with the hook-shaped parts 9c and convex parts 9d that engage with the first holes 3b and the second holes 3c, and the connected portions 90a and 90b between the hook-shaped parts 9c and convex parts 9d and the protruding portions 9b are disposed so as substantially not to overlap the supports 9a, as seen in a direction perpendicular to the display face 1a. Consequently, fewer shadows will be produced at the display component 1 near the distal end parts 9e of the panel posts 9, which are attributable to the leakage of light from the light source components 6 at a side of a face (rear face side) of the rear frame 3 that is not the display face 1a.

Also, with the third embodiment, as discussed above, there are provided the reflecting sheet 7, which is disposed along the face of the rear frame 3 on the display component 1 side, and the panel post-use reflecting sheet 307, which is disposed between the supports 9a and the rear frame 3, is disposed so as to overlap the entire region of the supports 9a as seen in a direction perpendicular to the display face 1a, and has a higher reflectivity of light than the reflecting sheet 7. Consequently, compared to when the reflecting sheet 7 is disposed so as to overlap substantially the entire region of the supports 9a as seen in a direction perpendicular to the display face 1a, more light can be reflected to the display component 1 side by the panel post-use reflecting sheet 307, which has high reflectivity, so even fewer shadows will be produced on the display component 1 near the distal end parts 9e of the panel posts 9.

Modification Examples

The embodiments disclosed herein are just examples in every respect, and should not be interpreted as being limiting in nature. The scope of the invention being indicated by the appended claims rather than by the above description of the embodiments, all modifications (modification examples) within the meaning and range of equivalency of the claims are included.

For instance, in the first to third embodiments above, a liquid crystal television device is used as an example of the display device of the present invention, but the present invention is not limited to this. Something other than a liquid crystal television device can be used as the display device in the present invention. For instance, a display device for a PC (personal computer) or any other common display device can be used.

Figure 10:
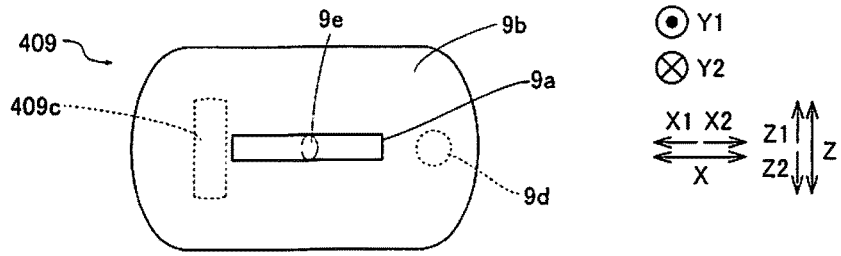
FIG. 10 is a top plan view of a panel post in accordance with a first modification example.

Also, in the first to third embodiments above, an example is given in which the hook-shaped parts are disposed extending in the left and right direction, but the present invention is not limited to this. For example, in the present invention, hook-shaped parts 409c can be disposed extending in the up and down direction (Z direction), as with the panel posts 409 in the first modification example shown in FIG. 10. The panel posts 409 are an example of the "support component" of the present disclosure. Also, hooks 409*f* are an example of the "second holding portion" of the present disclosure. The rest of the configuration in the first modification example is the same as that in the first embodiment above.

Figure 11:
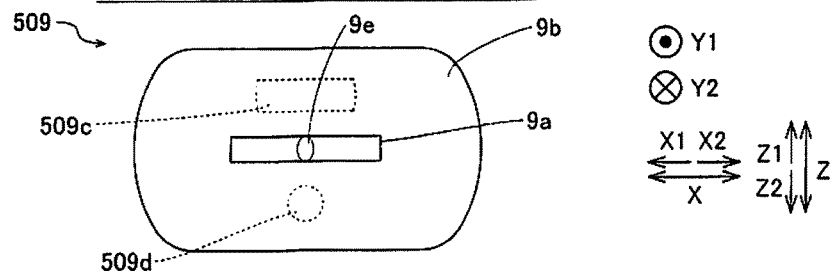
FIG. 11 is a top plan view of a panel post in accordance with a second modification example.

Also, in the first to third embodiments above, an example is given in which hook-shaped parts and convex parts are disposed on the left and right direction sides of the supports, but the present invention is not limited to this. For example, in the present invention, hook-shaped parts 509*c* and convex parts 509*d* can be disposed on the up and down direction side (Z direction side) of the supports 9*a*, as with the panel posts 509 in the second modification example shown in FIG. 11. The panel posts 509 are an example of the "support component" of the present disclosure. Also, hooks 509*f* are an example of the "second holding portion" of the present disclosure. The rest of the configuration in the second modification example is the same as that in the first embodiment above.

Figure 12:
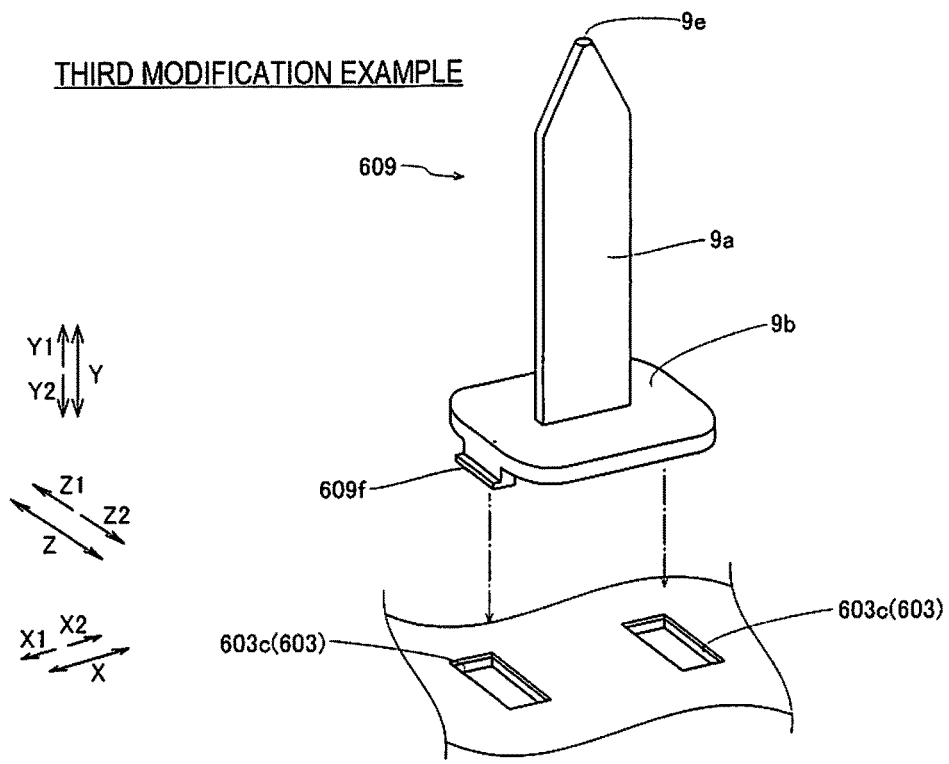
FIG. 12 is a partial exploded perspective view of a liquid crystal television device in accordance with a third modification example, illustrating the attachment of a panel post to a rear frame of the liquid crystal television device.

Also, in the first embodiment above, an example is given in which the panel posts are attached to the rear frame by hook-shaped parts and convex parts, but the present invention is not limited to this. For example, in the present invention, the panel posts 609 can be attached to the rear frame 603 by means of a pair of hooks 609*f* (only the one on the X1 direction side is shown in FIG. 12) provided protruding rearward (in the Y2 direction) from the ends of the protruding portion 9*b* in the left and right direction (X direction), and a pair of rectangular holes 603*c* provided to the rear frame 603, as with the panel posts 609 in the third modification example shown in FIG. 12. In the illustrated embodiment, the hooks 609*f* extends outwards relative to the outer peripheral edge of the protruding portion 9*b*. The panel posts 609 are an example of the "support component" of the present disclosure. Also, the hooks 609*f* are an example of the "second holding portion" of the present disclosure. Also, the rear frame 603 is an example of the "housing" of the present disclosure. The rest of the configuration in the third modification example is the same as that in the first embodiment above. Also, in the illustrated embodiment, the rectangular holes 603*c* (e.g., first holding portions) include holes, and the hooks 609*f* (e.g., second holding portions) include hooks that extend through the rectangular holes 603*c* to engage with the rectangular holes 603*c*. Also, in the illustrated embodiment, the support 9*a* (e.g., main body portion) has a rectangular shape as seen in the direction perpendicular to the display face 1*a*, the rectangular holes 603*c* (e.g., two of the first holding portions) are provided corresponding to the hooks 609*f* (e.g., second holding portions). The distance between the rectangular holes 603*c* (e.g., first holding portions) is larger than the width of the support 9*a* (e.g., main body portion) in the X direction (e.g., lengthwise direction of the main body portion) as seen in the direction perpendicular to the display face 1*a*.

Also, in the third embodiment above, an example is given in which the second reflector of the present invention is a panel post-use reflecting sheet, but the present invention is not limited to this. The second reflector of the present invention can instead be a flat part that has been given a mirror finish or coated with a paint capable of reflecting light, rather than a panel post-use reflecting sheet.

Also, in the third embodiment above, an example is given in which a panel post-use reflecting sheet is disposed only in the region overlapping the supports, as seen in a direction perpendicular to the display face, but the present invention is not limited to this. In the present invention, the panel post-use reflecting sheet can be disposed in a region overlapping the supports and the protrusions, as seen in a direction perpendicular to the display face.

Also, in the first to third embodiments above, an example is given in which an LED is used as the light source of the present invention, but the present invention is not limited to this. In the present invention, a point light source other than an LED can be used as the light source.

Also, in the first to third embodiments above, an example is given in which boards on which LEDs are mounted are arranged in parallel on the rear frame, but the present invention is not limited to this. The present invention can be configured such that boards on which LEDs are mounted are disposed in something other than a parallel layout. For instance, the boards on which LEDs are mounted can be disposed in an X shape, or can be disposed randomly.

Also, in the first to third embodiments above, an example is given in which two panel posts are provided, but the present invention is not limited to this. In the present invention, just one panel post or three or more can be provided.

Figure 13:
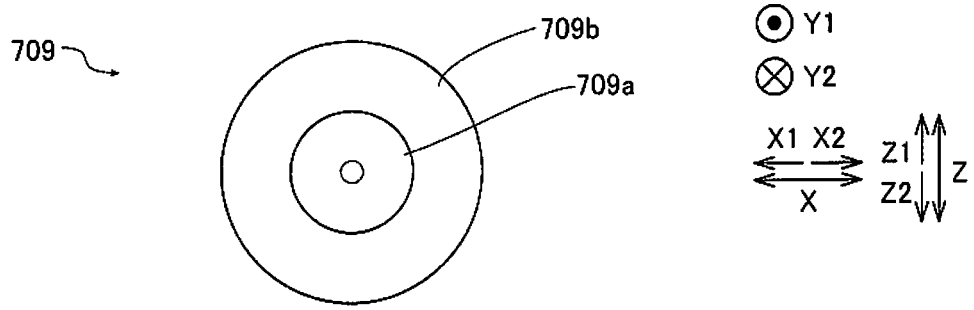
FIG. 13 is a top plan view of a panel post in accordance with a fourth modification example.

Also, in the first to third embodiments above, an example is given in which the supports of the panel posts are rectangular and the protruding portions are elliptical as seen in a direction perpendicular to the display face (Y direction), but the present invention is not limited to this. The present invention can be configured such that supports 709*a* and protruding portions 709*b* are circular, as seen in a direction perpendicular to the display face, as with the panel posts 709 in the fourth modification example shown in FIG. 13. The panel posts 709 are an example of the "support component" of the present disclosure. The supports 709*a* are an example of the "main body portions" of the present disclosure.

Figure 14:
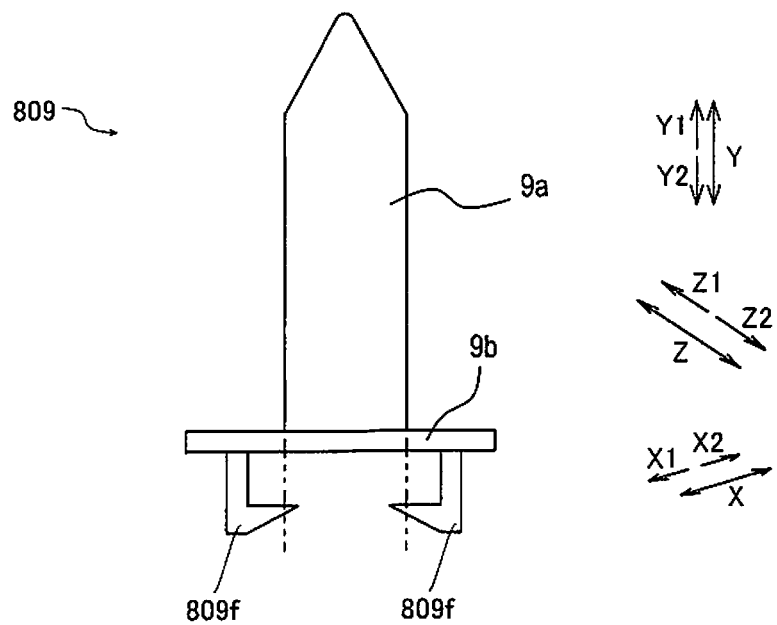
FIG. 14 is a side elevational view of a panel post in accordance with a fifth modification example.

Also, in the first to third embodiments above, an example is given in which the supports do not overlap the engagement protruding portions or the hook-shaped parts or convex parts, which are the second holding portions in the present invention, but the present invention is not limited to this. The present invention can be configured such that the support 9*a* at least partially overlaps hooks 809*f* as seen in a direction perpendicular to the display face 1*a* (Y direction), as with the panel posts 809 in the fifth modification example shown in FIG. 14, for example. The hooks 809*f* have distal ends that extend inward, and engage with inside edges of holes, such as rectangular holes 603*c* (see FIG. 12). The panel posts 809 are an example of the "support component" of the present disclosure. The hooks 809*f* are an example of the "second holding portion" of the present disclosure.

[1] In view of the state of the known technology and in accordance with a first aspect of the present invention, a display device comprises a display, a light source, a housing, an optical component, and a support component. The light source is configured to emit light towards the display. The housing accommodates the light source, and includes a bottom portion that has a first holding portion and a side wall that extends towards the display from an outer peripheral edge of the bottom portion. The optical component is disposed between the display and the housing. The support component supports the optical component, and is held by the first holding portion. The support component includes a translucent main body portion that is disposed on the bottom portion and extends towards the optical component, a protruding portion that protrudes in a direction parallel to a main face of the display from the main body portion, and a second holding portion that is provided to the protruding portion and is held by the first holding portion.

Also, for example, a connected portion of the second holding portion and the protruding portion can be located at a substantially non-overlapping location relative to the main body portion as seen in a direction perpendicular to the main face. With this display device, the first holding portion is provided to the housing, the main body portion and the second holding portion held by the first holding portion are provided to the support component. The connected portion of the second holding portion and the protruding portion is disposed so as substantially not to overlap the main body portion as seen in the direction perpendicular to the main face. Consequently, compared to when the connected portion and the main body portion are disposed so as to overlap each other as seen in the direction perpendicular to the main face, the second holding portion and the end of the main body portion on the housing side are disposed away from each other. Thus, it is less likely that light will infiltrate from the main body portion into the second holding portion, and the light leakage from the housing and so forth can be suppressed. Also, the amount of light that is reflected on the housing side toward the distal end side of the support component can be increased. As a result, there are fewer shadows on the display near the distal end of the support component, which are attributable to the leakage of the light from the light source to a side of a face (rear face side) of the housing that faces opposite to the main face. Here, the connected portion being disposed substantially not to overlap the main body portion as seen in the direction perpendicular to the main face refers to at least a part of the connected portion being disposed outside of a region corresponding to the main body portion as seen in the direction perpendicular to the main face. Similarly, the connected portion being located at a substantially non-overlapping location relative to the main body portion as seen in a direction perpendicular to the main face refers to at least a part of the connected portion being located outside of a region corresponding to the main body portion as seen in the direction perpendicular to the main face.

[2] In accordance with a preferred embodiment according to the display device mentioned above, the display device further comprises a reflector that is disposed between the housing and the main body portion, and is configured to reflect the light from the light source component.

[3] In accordance with a preferred embodiment according to any one of the display devices mentioned above, the reflector is arranged relative to the main body portion to overlap at least 80% of an entire region of the main body portion as seen in a direction perpendicular to the main face. With this configuration, the proportion accounted for by the region in which the reflector overlaps the main body portion with respect to the entire region of the main body portion as seen in the direction perpendicular to the main face is at least 80% (so that it will be relatively larger). Thus, the light from the optical component side can be reflected more effectively by the reflector.

[4] In accordance with a preferred embodiment according to any one of the display devices mentioned above, the reflector is arranged relative to the main body portion to overlap substantially an entire region of the main body portion as seen in the direction perpendicular to the main face. With this configuration, the reflector is disposed so as to overlap substantially the entire region of the main body portion as seen in the direction perpendicular to the main face. Thus, the light from the optical component side can be reflected even more effectively by the reflector.

[5] In accordance with a preferred embodiment according to any one of the display devices mentioned above, the reflector is arranged to overlap substantially an entire region in which the main body portion and the optical component contact with each other as seen in the direction perpendicular to the main face. With this configuration, the reflector is disposed so as to overlap substantially the entire region of the region in which the main body portion and the optical component contact with each other. Thus, the light from the optical component side can be effectively reflected by the reflector.

[6] In accordance with a preferred embodiment according to any one of the display devices mentioned above, the reflector is arranged to overlap an entire region of the main body portion in which a distance between the main body portion and the optical component is less than or equal to a predetermined distance as seen in the direction perpendicular to the main face.

[7] In accordance with a preferred embodiment according to any one of the display devices mentioned above, the first holding portion extends through the reflector and protrudes towards the display, and the second holding portion protrudes in the direction parallel to the main face of the display. With this configuration, if the housing is made of sheet metal, the first holding portion can be easily formed by cutting and lifting the sheet metal. Also, compared to when the second holding portion is engaged in a hole that passes through to a side of a face (rear face side) that is opposite to the main face, there will be less leakage of the light from the light source to the rear face side of the housing. Thus, even fewer shadows will be produced on the display near the distal end of the support component.

[8] In accordance with a preferred embodiment according to any one of the display devices mentioned above, the reflector includes a first reflector that is disposed along a face of the housing facing towards on the display, and a second reflector that is disposed between the housing and the main body portion and is arranged to overlap the main body portion as seen in the direction perpendicular to the main face. The second reflector has a reflectivity of light that is higher than that of the first reflector. With this configuration, compared to when the first reflector is disposed so as to overlap the main body portion as seen in the direction perpendicular to the main face, more light can be reflected to the display side by the second reflector with higher reflectivity. Thus, even fewer shadows will be produced on the display near the distal end of the support component.

[9] In accordance with a preferred embodiment according to any one of the display devices mentioned above, the second holding portion is located at a non-overlapping location relative to the main body portion as seen in a direction perpendicular to the main face.

[10] In accordance with a preferred embodiment according to any one of the display devices mentioned above, the first holding portion is located at a substantially non-overlapping location relative to the main body portion as seen in a direction perpendicular to the main face.

[11] In accordance with a preferred embodiment according to any one of the display devices mentioned above, two of the second holding portions are provided, and the second holding portions are provided on both sides of the main body portion as seen in a direction perpendicular to the main face. With this configuration, the second holding portions are engaged with the first holding portions (the support component is attached to the housing) on both sides of the main body portion. Thus, the support component can be stably attached to the housing even if the first holding portions and second holding portions are offset from the main body portion.

[12] In accordance with a preferred embodiment according to any one of the display devices mentioned above, the main body portion has a rectangular shape as seen in a direction perpendicular to the main face, and the second holding portion is adjacent to the main body portion in a lengthwise direction of the main body.

[13] In accordance with a preferred embodiment according to any one of the display devices mentioned above, the second holding portion has a rectangular shape as seen in a direction perpendicular to the main face, and a center line of the second holding portion that bisects the second holding portion in a lengthwise direction of the second holding portion is located at a non-overlapping location relative to the main body portion.

[14] In accordance with a preferred embodiment according to any one of the display devices mentioned above, the first holding portion includes a hole, and the second holding portion includes a hook that extends through the hole to engage with the hole.

[15] In accordance with a preferred embodiment according to any one of the display devices mentioned above, the main body portion has a rectangular shape as seen in the direction perpendicular to the main face, two of the first holding portions are provided corresponding to the second holding portions, and a distance between the first holding portions is larger than a width of the main body portion in a lengthwise direction of the main body portion as seen in the direction perpendicular to the main face.

[16] In view of the state of the known technology and in accordance with a second aspect of the present invention, a display device comprises a display, a housing, a light source, an optical component, and a support component. The housing includes a first holding portion and is disposed on an opposite side of a display face of the display. The optical component is disposed between the display and the light source to receive light from the light source and to emit the light towards the display. The support component includes a translucent main body portion that protrudes from the housing towards the optical component, and a second holding portion that engages with the first holding portion. At least a part of the second holding portion is located at a non-overlapping location relative to the main body portion as seen in a direction perpendicular to the display face.

[17] In accordance with a preferred embodiment according to the display device mentioned above, the display device further comprises a reflector that is disposed between the housing and the main body portion, and is configured to reflect the light from the light source.

[18] In accordance with a preferred embodiment according to any one of the display devices mentioned above, the reflector is arranged relative to the main body portion to overlap at least 80% of an entire region of the main body portion as seen in the direction perpendicular to the display face.

[19] In accordance with a preferred embodiment according to any one of the display devices mentioned above, the reflector is arranged relative to the main body portion to overlap substantially the entire region of the main body portion as seen in the direction perpendicular to the display face.

[20] In accordance with a preferred embodiment according to any one of the display devices mentioned above, the reflector is arranged to overlap substantially an entire region in which the main body portion and the optical component contact with each other as seen in the direction perpendicular to the display face.

With the present invention, as discussed above, it is possible to suppress shadows that occur in the display near the distal end of post by preventing the leakage of the light from the light source on the rear face side of the housing.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe the display device should be interpreted relative to a display device in an upright position on a horizontal surface. The terms "left" and "right" are used to indicate the "right" when referencing from the right side as viewed from the front of the display device, and the "left" when referencing from the left side as viewed from the front of the display device.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
a display;
a light source that emits light towards the display;
a housing accommodating the light source, the housing including a bottom portion and a side wall, the bottom portion having a first holding portion, the side wall extending towards the display from an outer peripheral edge of the bottom portion;
an optical component disposed between the display and the housing;
a support component supporting the optical component, and being held by the first holding portion, the support component including a translucent main body portion that extends towards the optical component, a protruding portion that protrudes outward with respect to the main body portion, and a second holding portion that is held by the first holding portion; and
a reflector that is disposed between the housing and the main body portion, and reflects the light from the light source,
the support component transmitting through the main body portion the light that has been reflected by a portion of the reflector that is disposed underneath the main body portion to irradiate the display with the light that has been reflected by the portion of the reflector and has exited from a distal end of the main body portion, and
the support component has a light irradiation surface that is irradiated with the light that has been reflected by the portion of the reflector, the light irradiation surface overlapping a contact portion at which the main body portion and the optical component contact with each other as seen in a direction perpendicular to the main face.

2. The display device according to claim 1, wherein the reflector is arranged relative to the main body portion to overlap at least 80% of an entire region of the main body portion as seen in a direction perpendicular to the main face.

3. The display device according to claim 1, wherein the reflector is arranged to overlap an entire region of the main body portion in which a distance between the main body portion and the optical component is less than or equal to a predetermined distance as seen in the direction perpendicular to the main face.

4. The display device according to claim 1, wherein the first holding portion extends through the reflector and protrudes towards the display, and
the second holding portion protrudes in the direction parallel to the main face of the display.

5. The display device according to claim 1, wherein the reflector includes a first reflector that is disposed along a face of the housing facing towards the display, and a second reflector that is disposed between the housing and the main body portion and is arranged to overlap the main body portion as seen in the direction perpendicular to the main face, with the second reflector having a reflectivity of light that is higher than that of the first reflector.

6. The display device according to claim 1, wherein the second holding portion is located at a non-overlapping location relative to the main body portion as seen in a direction perpendicular to the main face.

7. The display device according to claim 1, wherein the first holding portion is located at a substantially non-overlapping location relative to the main body portion as seen in a direction perpendicular to the main face.

8. The display device according to claim 1, wherein two of the second holding portions are provided, and
the second holding portions are provided on both sides of the main body portion as seen in a direction perpendicular to the main face.

9. The display device according to claim 1, wherein the main body portion has a rectangular shape as seen in a direction perpendicular to the main face, and
the second holding portion is adjacent to the main body portion in a lengthwise direction of the main body.

10. The display device according to claim 1, wherein the second holding portion has a rectangular shape as seen in a direction perpendicular to the main face, and
a center line of the second holding portion that bisects the second holding portion in a lengthwise direction of the second holding portion is located at a non-overlapping location relative to the main body portion.

11. The display device according to claim 1, wherein the first holding portion includes a hole, and
the second holding portion includes a hook that extends through the hole to engage with the hole.

12. The display device according to claim 8, wherein the main body portion has a rectangular shape as seen in the direction perpendicular to the main face,
two of the first holding portions are provided corresponding to the second holding portions, and
a distance between the first holding portions is larger than a width of the main body portion in a lengthwise direction of the main body portion as seen in the direction perpendicular to the main face.

13. A display device comprising:
a display;
a light source that emits light towards the display;
a housing accommodating the light source, the housing including a bottom portion and a side wall, the bottom portion having a first holding portion, the side wall extending towards the display from an outer peripheral edge of the bottom portion;
an optical component disposed between the display and the housing;
a support component supporting the optical component, and being held by the first holding portion, the support component including a translucent main body portion that is disposed on the bottom portion and extends towards the optical component, a protruding portion that protrudes in a direction parallel to a main face of the display from the main body portion, and a second holding portion that is provided to the protruding portion and is held by the first holding portion; and
a reflector that is disposed between the housing and the main body portion, and reflects the light from the light source,
the support component transmitting through the main body portion the light that has been reflected by a portion of the reflector that is disposed underneath the main body portion to irradiate the display with the light that has been reflected by the portion of the reflector and has exited from a distal end of the main body portion, and the reflector being arranged relative to the main body portion to overlap substantially an entire region of the main body portion as seen in a direction perpendicular to the main face.

14. A display device comprising:
a display;
a light source that emits light towards the display;
a housing accommodating the light source, the housing including a bottom portion and a side wall, the bottom portion having a first holding portion, the side wall extending towards the display from an outer peripheral edge of the bottom portion;
an optical component disposed between the display and the housing;
a support component supporting the optical component, and being held by the first holding portion, the support component including a translucent main body portion that is disposed on the bottom portion and extends towards the optical component, a protruding portion that protrudes in a direction parallel to a main face of the display from the main body portion, and a second holding portion that is provided to the protruding portion and is held by the first holding portion; and
a reflector that is disposed between the housing and the main body portion, and reflects the light from the light source,
the support component transmitting through the main body portion the light that has been reflected by a portion of the reflector that is disposed underneath the main body portion to irradiate the display with the light that has been reflected by the portion of the reflector and has exited from a distal end of the main body portion, and
the reflector being arranged to overlap substantially an entire region in which the main body portion and the optical component contact with each other as seen in a direction perpendicular to the main face.

15. A display device comprising:
a display;
a housing including a first holding portion and disposed on an opposite side of a display face of the display;
a light source;
an optical component disposed between the display and the light source to receive light from the light source and to emit the light towards the display;
a support component including a translucent main body portion that protrudes from the housing towards the optical component, and a second holding portion that engages with the first holding portion; and
a reflector that is disposed between the housing and the main body portion, and reflects the light from the light source,
at least a part of the second holding portion being located at a non-overlapping location relative to the main body portion as seen in a direction perpendicular to the display face, and
the support component transmitting through the main body portion the light that has been reflected by a portion of the reflector that is disposed underneath the main body portion to irradiate the display with the light that has been reflected by the portion of the reflector and has exited from a distal end of the main body portion, and
the support component has a light irradiation surface that is irradiated with the light that has been reflected by the portion of the reflector, the light irradiation surface overlapping a contact portion at which the main body portion and the optical component contact with each other as seen in the direction perpendicular to the main face.

16. The display device according to claim 15, wherein the reflector is arranged relative to the main body portion to overlap at least 80% of an entire region of the main body portion as seen in the direction perpendicular to the display face.

17. A display device comprising:
a display;
a housing including a first holding portion and disposed on an opposite side of a display face of the display;
a light source;
an optical component disposed between the display and the light source to receive light from the light source and to emit the light towards the display;
a support component including a translucent main body portion that protrudes from the housing towards the optical component, and a second holding portion that engages with the first holding portion; and
a reflector that is disposed between the housing and the main body portion, and reflects the light from the light source,
at least a part of the second holding portion being located at a non-overlapping location relative to the main body portion as seen in a direction perpendicular to the display face, and
the support component transmitting through the main body portion the light that has been reflected by a portion of the reflector that is disposed underneath the main body portion to irradiate the display with the light that has been reflected by the portion of the reflector and has exited from a distal end of the main body portion, and
the reflector being arranged relative to the main body portion to overlap substantially the entire region of the main body portion as seen in the direction perpendicular to the display face.

18. A display device comprising:
a display;
a housing including a first holding portion and disposed on an opposite side of a display face of the display;
a light source;
an optical component disposed between the display and the light source to receive light from the light source and to emit the light towards the display;
a support component including a translucent main body portion that protrudes from the housing towards the optical component, and a second holding portion that engages with the first holding portion; and
a reflector that is disposed between the housing and the main body portion, and reflects the light from the light source,
at least a part of the second holding portion being located at a non-overlapping location relative to the main body portion as seen in a direction perpendicular to the display face, and
the support component transmitting through the main body portion the light that has been reflected by a portion of the reflector that is disposed underneath the main body portion to irradiate the display with the light that has been reflected by the portion of the reflector and has exited from a distal end of the main body portion, and the reflector being arranged to overlap substantially an entire region in which the main body portion and the optical component contact with each other as seen in the direction perpendicular to the display face.

* * * * *